United States Patent [19]

Kirkpatrick

[11] 3,818,232
[45] June 18, 1974

[54] CONTAINER FILL LEVEL INSPECTOR WITH PRODUCT AVERAGING SYSTEM

[75] Inventor: Frederick J. Kirkpatrick, Austin, Tex.

[73] Assignee: Nuclearay Inc., Austin, Tex.

[22] Filed: Dec. 13, 1972

[21] Appl. No.: 314,769

[52] U.S. Cl............. 250/357, 250/223 B, 356/240
[51] Int. Cl. .......................................... G01n 23/10
[58] Field of Search................ 250/224, 357, 223 B; 356/240

[56] References Cited
UNITED STATES PATENTS

| 3,094,214 | 6/1963 | Wyman et al............... 250/223 B X |
| 3,478,221 | 11/1969 | Sainsbury........................ 250/223 B |
| 3,617,735 | 11/1971 | Shoemaker.......................... 250/357 |
| 3,727,068 | 4/1973 | Poynton et al.............. 250/223 B X |

Primary Examiner—Archie R. Borchelt

[57] ABSTRACT

Method and apparatus for continuous monitoring of containers being conveyed from an automatic filling machine after completion of the filling operation to determine the average fill level of the containers. Averaging may be accomplished by a block averaging system that averages the fill level for selected groups of the filling heads of the machine, averages the fill level for a selected filling head of the machine or provides continuous averaging of all of the filling heads of the filling machine. The monitoring system may also employ a synchronization circuit to insure accuracy of the fill level averaging accomplished by the system. Fill level signals generated by inspection of each container being conveyed from the filling machine may be stored temporarily while synchronization is confirmed between a selected number of the filling heads of the machine and the number of containers filled by the filling heads of the machine during each filling cycle thereof.

17 Claims, 10 Drawing Figures

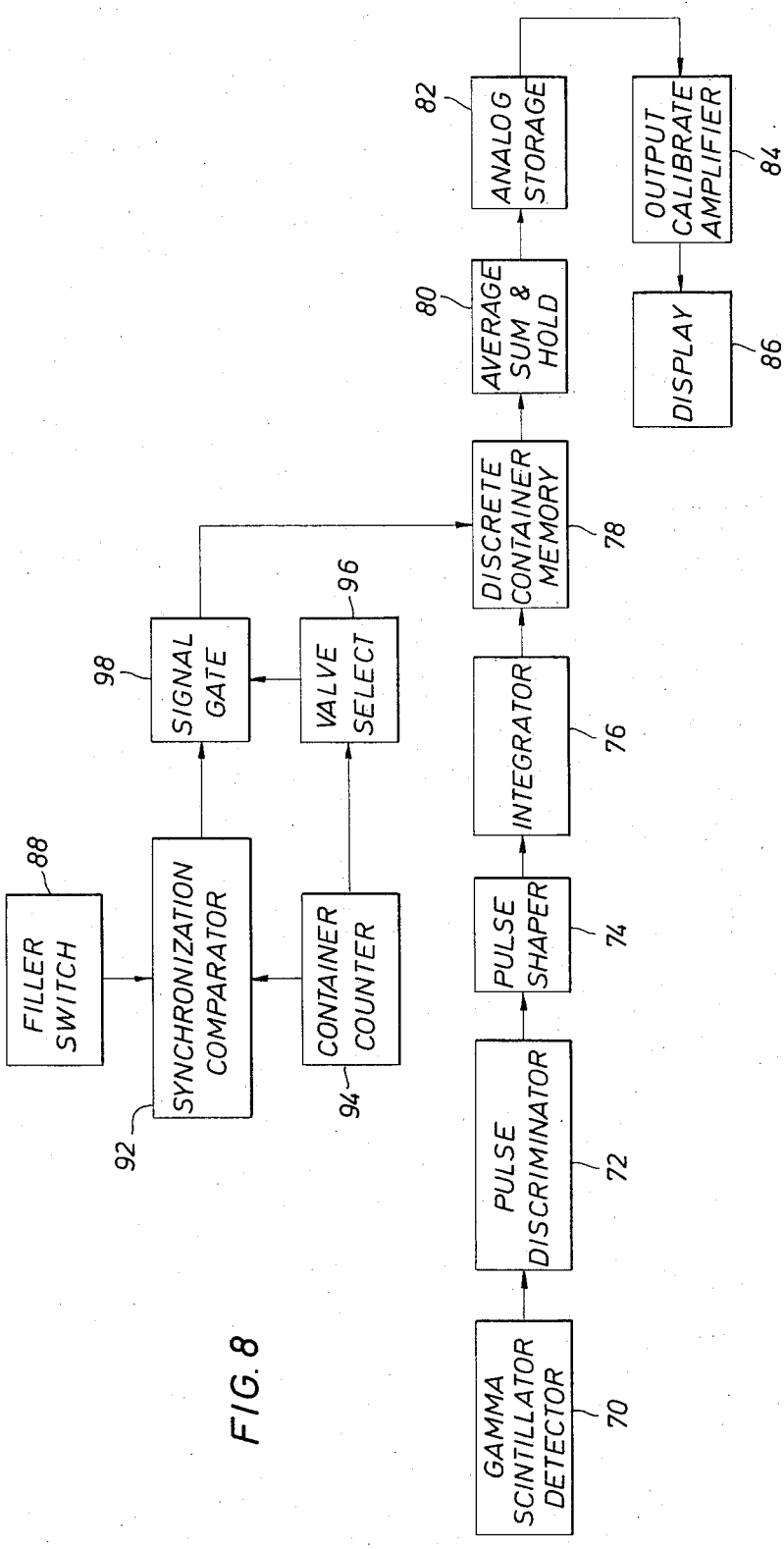

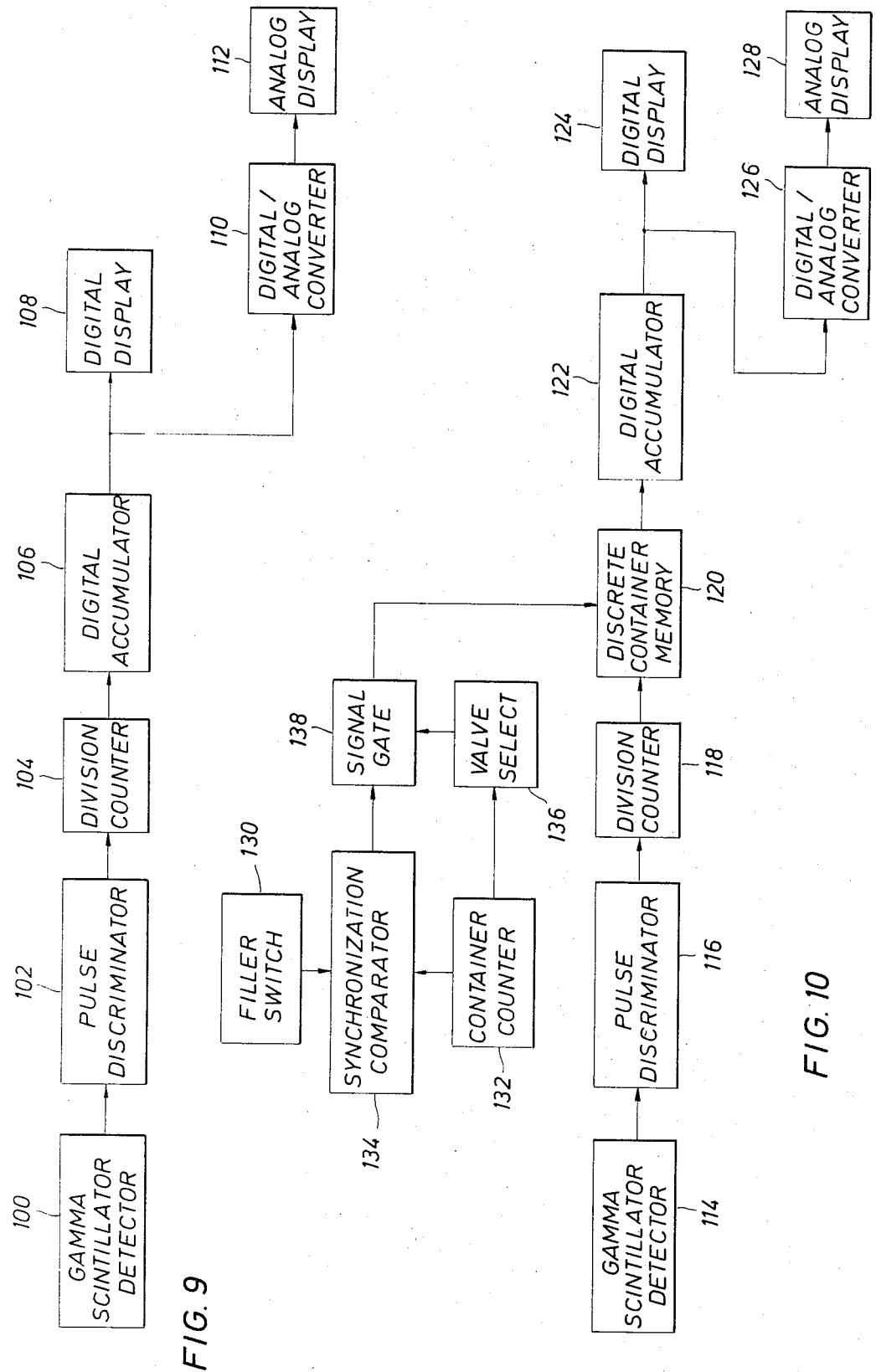

CONTAINER FILL LEVEL INSPECTOR WITH PRODUCT AVERAGING SYSTEM

FIELD OF THE INVENTION

This invention relates generally to automatic container filling machines incorporating a single filling head or a plurality of filling heads for filling containers with a product and more specifically relates to a method and apparatus for continuously monitoring fill containers being conveyed from the filling machine and providing an output signal display representing the average fill level of selected groups of the filled containers conveyed from the filling machine.

BACKGROUND OF THE INVENTION

In the product packaging industry there is widespread use of container filling machines that automatically fill containers with various products that may range from liquid products such as beer and various soft drinks to semi-liquid products such as soup and various canned vegetables.

In the interest of economics and also in the interest of consumer relations, it is desirable that the containers contain precisely the amount of product recited on the container. It is therefore very important to closely control the fill level of products filled by automatic filling machines. If excessive amounts of product are dispensed by the machine into each container or if the average amount of product dispensed is excessive, the economic nature of the product is adversely affected. Also, if filling machines frequently dispense insufficient amounts of product into the containers relations between the consumer and the marketer of the products will be adversely affected.

When containerized products are sold to the consuming public, the consuming public is generally protected by various federal, state and local regulations. It is typically required that the outside of the container bear a designation indicating the specific amount of product disposed within the container and the sale of insufficiently filled containers to consumers will generally constitute a violation of controlling regulations.

In the product packaging industry, therefore, it is typically the case for product reject systems to be employed which systems detect the amount of product within each filled container being conveyed from an automatic filling machine and rejecting any containers that are found to contain insufficient amounts of product. Obviously, it is possible to insure detection and rejection of each insufficiently filled container, but concerted efforts are always made to insure that the minimum fill level of all containers is at least above the minimum limits set by the various regulatory bodies. To promote purchaser's satisfaction and maintain optimum economic conditions, it is therefore desirable to insure that automatic container filling machines achieve accurate filling of each container dispensed.

Although some filling machines are of the single filling head type such as those employed in the diary product packing industry, container filling machines typically are rotary filling devices employing a large number of filling heads, also known as filling pockets, each of which being capable of filling one container as the rotary filling machine revolves one revolution. Empty containers are fed into the machine and come into contact with one of the filling heads and are filled while traversing one revolution in assembly with the filling head. After the containers have been filled by the filling machine, they may be capped and sealed and then may be conveyed from the filling machine to a further handling facility or to a facility where the containers are packaged for shipment to purchasers.

As is typically the case, each of the filled containers exiting from the filling machine is passed by a discharge conveyer through an inspection station where the level of fluid in the containers is inspected by rays capable of penetrating the container within which the product is disposed. X-ray or gamma ray inspection systems are widely used for inspection of filled containers. As the containers pass through the inspection station, a beam of radiating energy is allowed to pass from a radiation source, such as an X-ray or gamma radiation source, for example, and the beam is attenuated by liquid within the container, which attenuation is proportional to the level of liquid in the container. The attenuated rays impinge upon a radiation detector which detects the radiation rate intensity and produces an electrical signal that is proportional to the degree of attenuation caused by the level of liquid, also referred to as the fill level, in the container. Proportional changes in the detected radiation rate occur when the material level in the filled container is above or below an optimum fill level defined intermediate a radiation pattern generated by the radiation source. When the material level in the container moves up through the radiation pattern, the product within the container acts as a radiation absorber and the rate and intensity of the radiation acting upon the detector decreases. Conversely, as the material level moves down through the radiation pattern the rate and intensity of the radiation impinging upon the detector increases. The signal output of the radiation detector is typically a series of electrical pulses each representing a detected radiation ray such as a gamma ray. The number of pulses per unit time is proportional to the detected rate and intensity of the radiation.

Depending upon the degree to which the radiation is attenuated by the liquid level in the container and related to control circuitry in the form of appropriately attenuated signal pulses, it is typically the practice for a container to be accepted or rejected, depending upon the condition of the output signal of the detector. If the output signal indicates a container to be insufficiently filled, a reject signal will be generated and the rejected container will be removed from the conveyer by an electrically responsive mechanical reject mechanism. All containers that are filled to a level above the reject level will obviously be accepted and will be allowed to remain on the conveyer and be conveyed for further processing and handling. In this case, it is not known just how much liquid is present in the filled containers. It is only known that the containers are filled at least to a minimum acceptable level.

Automatic filling machines are typically designed for operation over long periods of time and the adjustable filling heads or filling pockets of a machine may get out of adjustment due to vibration, clogging of fluid passages, wear, etc. and may begin filling containers with insufficient or excessive amounts of products. When this occurs, it becomes desirable to detect the filling head causing inaccurate filling of containers in order that the head may be adjusted and successive containers will be filled with the proper amount of product.

Some automatic filling machines have been developed which include means for detecting improperly adjusted filling heads and, in some cases, have been designed to achieve automatic adjustment of the individual filling heads. Some of the filling heads, however, may vary the amount of product dispensed into various containers within certain limits, which limits may be acceptable or unacceptable, depending upon the limits of the individual filling heads. It is desirable, therefore, to provide an automatic filling machine with a capability of averaging the detected fill levels for selected ones of the filling heads of the machine in order to determine if, on the average any particular filling head is excessively high or low in the filling of containers.

It may also be desirable to provide automatic filling machines with the capability of averaging selected blocks of the filling heads of the machine in order to determine if the selected block of filling heads, on the average, dispenses excessive or insufficient amounts of product. It may further be desirable to provide automatic filling machines with the capability of conducting averaging of all of the heads of the machine, taken simultaneously, or of averaging each of the fill levels produced by the various heads of the machine, depending upon the data characteristics desired for control and adjustment of the machine.

Another problem encountered in container inspection and rejection involves the bandedness of output signals due to such things as product slosh, container non-uniformity, conveyer bounce, and isotope source randomness. Containers filled by automatic filling machines may have a certain amount of form above the product level in the container which form may be mistaken during detection as an improper fill level thereby resulting in an error of the signal resulting from inspection of the container. Also, as containers are conveyed, the conveyer may undulate to some degree and the product, especially if the product is a thin liquid, may slosh about within the container thereby causing the detection apparatus to detect an improper fill level. A graphical plot of signals resulting from sloshing containers will appear as a rather wide band, but, when a large number of the signals are averaged errors caused by sloshing of the liquid will typically average out and the average fill level detected will be a true average. This will prevent containers from being rejected as improperly filled when the error signal generated might actually result from sloshing of liquid in a properly filled container.

It is therefore a primary object of the present invention to provide a method and apparatus for continuous inspection of filled containers in order to achieve averaging of the level of fill within the containers being filled by an automatic filling machine.

It is another important object of the present invention to provide a novel method and apparatus for continuously inspecting containers filled by an automatic filling machine wherein the fill levels relating to groups or blocks of contiguous filling heads of a rotary filling machine may be simultaneously averaged as the containers are conveyed from the filling machine.

It is an even further object of the present invention to provide a novel method and apparatus for continuously inspecting containers being filled by an automatic filling machine and for providing a signal representing the average fill level of containers being filled which signal, after a proper number of signals have been accumulated for averaging, may be updated by deleting the oldest signal of the signal group being averaged and by adding the latest signal to the group.

Among the several objects of the present invention is noted the contemplation of a novel method and apparatus for continuously monitoring the fill level of containers filled by an automatic filling machine wherein an average fill level signal may be generated that is representative of any selected filling head of the filling machine.

It is also an object of the present invention to provide a novel method and apparatus for continuous monitoring of containers filled by an automatic filling machine which may be capable of providing average signals representing a continuous average for each of the filling heads of the filling machine either selectively or simultaneously.

Another object of the present invention contemplates the provision of a novel method and apparatus for continuous inspection of filled containers exiting from an automatic filling machine which monitoring system includes synchronizing means to insure that numerical signals generated representative of containers being conveyed through an inspection station is synchronized with a selected number or the entire number of filling heads of a filling machine before the signals generated during a revolution of the filling machine are averaged.

It is also an important object of the present invention to provide a novel method and apparatus for continuous inspection of filled containers being conveyed from a filling machine which apparatus is subject to any desirable degree of sophistication depending upon the desired nature of averaged output signals generated by the inspection apparatus.

It is an even further object of the present invention to provide a novel method and apparatus for continuous monitoring of filled containers being conveyed from a filling machine which method and apparatus are of simple nature and the apparatus is reliable in use for extremely long periods of time at minimal operating expense.

Other and further objects, advantages and features of the invention will become obvious to one skilled in the art upon an understanding of the illustrative embodiments, about to be described and various advantages, not referred to herein, will occur to one skilled in the art upon employment of the invention in practice.

BRIEF SUMMARY OF THE INVENTION

As filled containers are conveyed from an automatic filling machine having a plurality of filling heads (which may also be referred to as filling pockets or filling valves) the containers are conveyed past a liquid level detector employing a container penetrating radiation technique, where penetrating radiation emitted by a radioactive source, such as a gamma source, is passed through the container and is attenuated by the liquid within the container. The attenuated radiation pattern passing through the container impinges upon a radiation detector which detects the radiation rate and intensity and produces an electrical signal that is proportional to the strength of the attenuated radiation detected. The detector output consists of serial pulses, the pulse rate of which is related inversely to the mass (product level) enclosed within the radiation field being emitted from the radioactive source through a field window.

The pulse stream being emitted responsive to attenuation of the radioactive beam or pattern may be subjected to a pulse shaping network and may then be transmitted to signal processing electronics, the configuration of which being selected for each function, such as reject decision, average level, etc., being performed. The pulse shaping network may utilize an integrator to perform pulse counting. Thus, a pulse shaping network insuring consistent pulse height and width may be utilized preceding transmission of the shaped detector pulses to a discriminator for conversion of the pulse rate information to a signal level. The integrator output signal of course varies up or down, depending upon the rate of the received radiation or gamma count relative to a preset standard reflecting the optimum fill level.

A temporary storage stage may be provided in units designed to reflect averaging of fill level signals generated responsive to individual filling heads. The temporary storage stage may comprise an operational amplifier having a memory capability allowing the signal to be held until a synchronization circuit can insure synchronization between the number of fill level signals generated at the inspection point and a similar number of selected filling heads of the filling machine. If the inspected containers fail to synchronize with the selected filling heads, the temporarily stored signals may be erased from the memory without being averaged. This insures that all averaging signals are based upon proper operational characteristics of the filling machine.

After control logic circuitry has established synchronization between the integrator signals accepted by the temporary storage, signals then may be released and transmitted to signal averaging circuitry. The signal averaging may be achieved by adding 1/n of the discrete container signal to similarily attenuated signals within a specific average block. The average block may be defined as every n containers, every n containers from a given valve or the last n containers in case the averaging accomplished is to take the nature of a running average. In any case, the specific averaging mode is determined by control logic.

Averaging may be implemented in an attenuator, summing amplifier and sample/hold circuit configuration. Obviously, other alternative methods may be employed for performing mathemathical computation, such as by using a small digital computer, for example. The degree of sophistication required will of course dictate the implementation apparatus for the averaging mode.

Finally, the averaged signal generated by the apparatus may be displayed in any one of several suitable ways, such as by graphical readout in the form of a strip chart recorder for example, by digital signal apparatus, or the like. If the averaging is accomplished in an analog mode, a single output amplifier may buffer the analog (average) signal to the signal display apparatus. The gain of the amplifier may be adjusted (scaled) to provide calibrated readings in appropriate units such as grams, millileters, ounces or inches, depending upon the desired characteristics of the output information.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof, which are illustrated in the appended drawings, which drawings form a part of this specification. It is to be understood, however, that the appended drawings illustrate only typical embodiments of the invention and therefore are not to be considered to be limiting of its scope, for the invention may admit to other equally effective embodiments.

IN THE DRAWINGS

Figure 1:
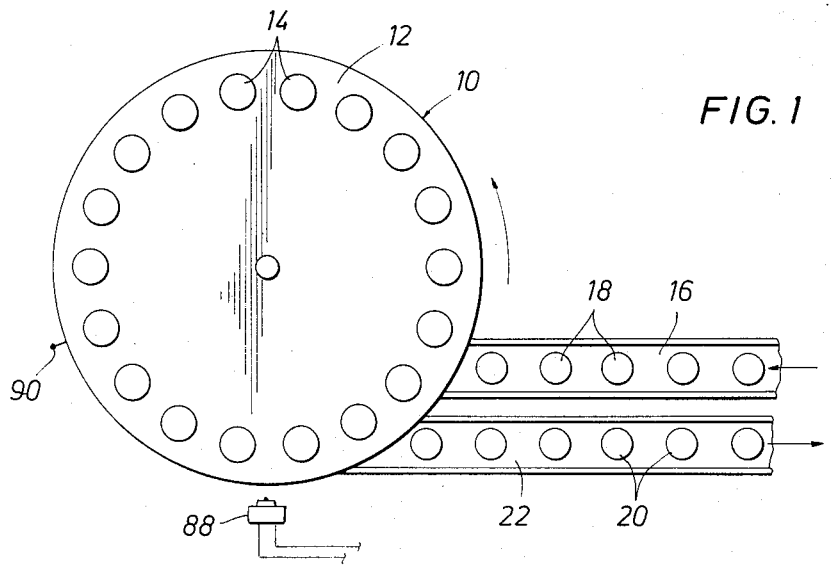

FIG. 1 is a pictorial representation in plane of a typical rotary container filling machine with directional arrows indicating conveyance of empty containers into the machine for filling and discharge of filled containers from the machine after being filled with a product.

Figure 2:
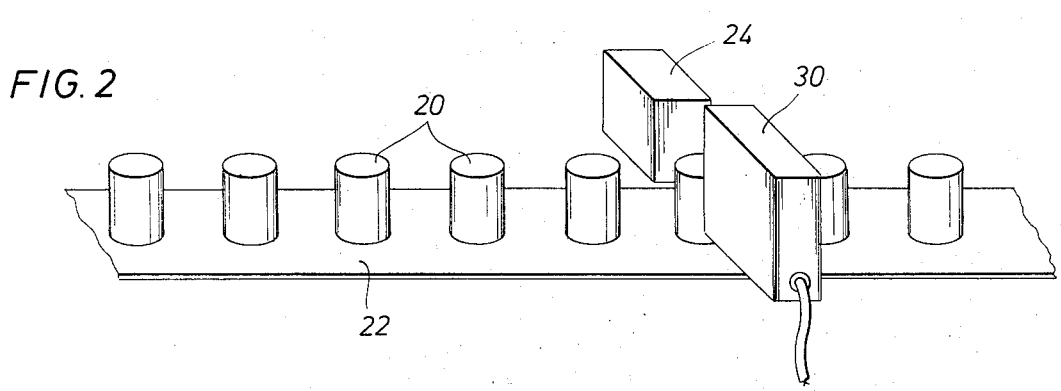

FIG. 2 is an isometric view illustrating the exit conveyer of a filling machine which may be of the nature illustrated in FIG. 1 and showing a plurality of containers being conveyed past an inspection station, where the fill level of the containers may be inspected in accordance with the teachings of this invention.

Figure 3:
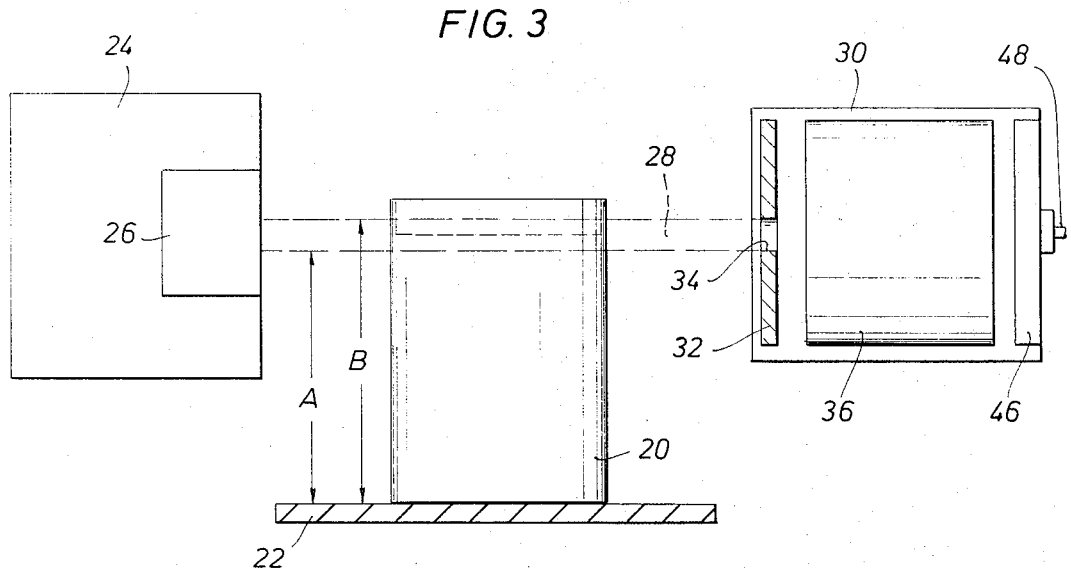

FIG. 3 is a sectional view taken through the conveyer illustrated in FIG. 2 and showing a radioactive beam passing through a container located on the conveyer and impinging upon a radiation detector having the capability of changing the attenuated radiation into electrical pulses which may be processed by appropriate signal electronic circuitry.

Figure 4:
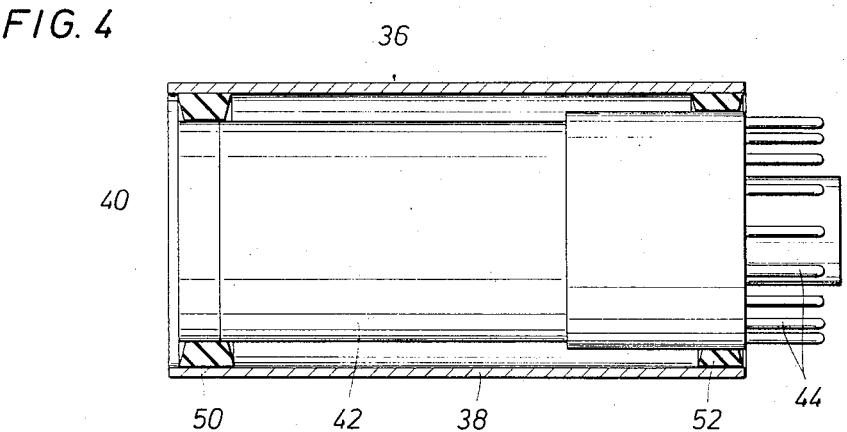

FIG. 4 is a sectional view of a radiation detector including electronic circuitry for signal conversion, which detector may be employed in inspection apparatus constructed in accordance with the present invention.

Figure 5:
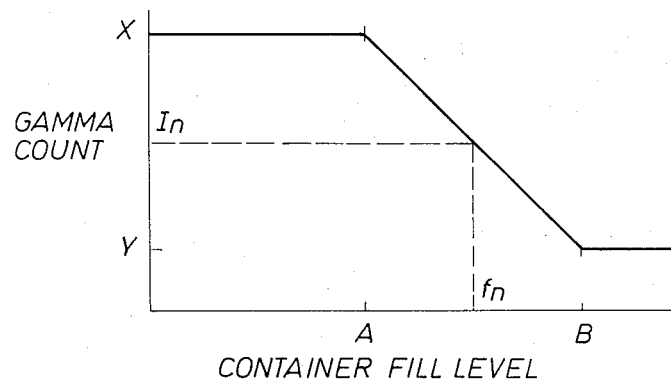

FIG. 5 is a graphical representation of the signal output of the radiation detector of FIG. 4 which produces electrical pulses/unit time reflecting inversely the linear decrease of signal pulses resulting from attenuation of the radiation beam by variation in the fill level within inspected containers.

Figure 6:
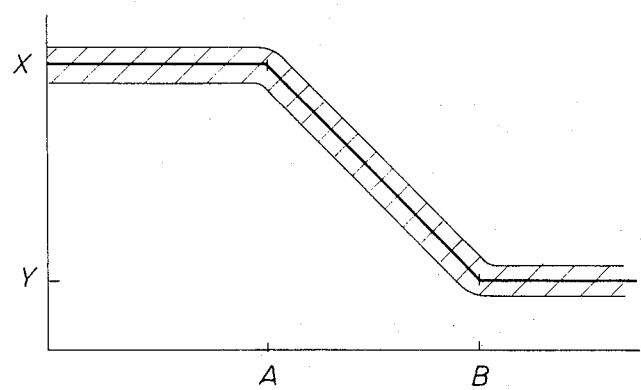

FIG. 6 is a graphical representation similar to FIG. 5 but showing the bandedness occurring due to product slosh of liquid within an inspected container which, for example, may be caused by undulation or shaking of a container by the conveyer, as the container is conveyed from the filling machine through the inspection station.

FIG. 7 is a schematic diagram representing a container fill level averaging circuit constructed in accordance with the present invention.

FIG. 8 is an electrical schematic diagram representing container fill level signal averaging circuitry of the nature illustrated in FIG. 7 and including a synchronization circuit for preventing averaging of accumulated fill level signals when the signals are not precisely representative of the number of selected filling heads of the filling machine.

FIG. 9 is an electrical schematic diagram illustrating sequential averaging electronics constructed in accordance with the present invention and including both digital and analog display.

FIG. 10 is an electronic schematic diagram illustrating container fill level averaging circuitry including both digital and analog display and also incorporating synchronization control circuitry to insure proper accumulation of signals for averaging.

DESCRIPTION OF PREFERRED EMBODIMENTS

Referring now to the drawings for a more detailed description of the invention, in FIG. 1 there is shown a rotary container filling machine, generally at 10, including a rotary mechanism 12 carrying a plurality of filling heads or filling pockets 14. The rotary mechanism 12 may rotate counterclockwise, as shown by the directional arrow in FIG. 1. An input conveyer 16 may be employed to convey containers 18 to be filled into the filling machine where each of the containers may come into contact with a respective one of the filling heads of the machine and may be carried a complete revolution by the machine during which time it is filled with a product. After being filled, the filled containers 22 are discharge from the rotary filling mechanism of the machine 10 onto a discharge conveyer 22, which is capable of conveying the filled containers to a facility for packaging and handling.

As the filled containers are being conveyed toward packaging and handling apparatus, therefore, it will be desirable to inspect the containers and determine if they have been properly filled by the filling machine 10. While some containers may be composed of a material through which the fill level of the container may be visualized, for the most part, containers are not capable of being inspected by visual means. It is therefore desirable to provide means for automatically inspecting closed containers for proper fill level and for providing an output signal that is generated proportionally to the height of the material level in each of the containers. The output signal then may be processed either for reject actuation, to remove improperly filled containers from the discharge conveyer and/or to otherwise process the fill level signals for any desirable use. As shown in FIG. 2, a housing 24 may be disposed on one side of the discharge conveyer 22 and may include a low level gamma radiation source 26 capable of emitting a radiation pattern 28 that may pass through a container being conveyed by the conveyer for detection of the level to which the container may be filled. The radioactive source 26 may, if desired, be a gamma radiation source or in the alternative it may take any other suitable form of radiation capable of passing through a container and being attenuated to some degree by the contents of liquid disposed within the container.

In accordance with the present invention, it is practical to provide a low level gamma radiation source capable of emitting a shaped radiation pattern which may, for example, be 1/16 to ¼ inch high and in the same plane as the material level of the container. The radiation pattern passes through the container and may impinge upon a radiation detector 30 which detects the radiation rate and intensity and produces an electrical signal that is proportional to the rate and intensity of the radiation pattern received thereby. The radiation detector 30 may comprise a lead collimator 32 having an aperture 34 formed therein for allowing a beam of radiation to enter the detector 30. The lead collimator absorbs all radiation except the radiation passing through the aperture or slot 34, thereby allowing a scintillation detector 36 disposed within the detector 30 to respond only to the radiation passing through the aperture.

As illustrated in FIG. 4, the scintillation detector, generally illustrated at 36, may comprise a housing 38 which also serves as a magnetic shield. A crystal 40, such as a cesium iodide, thalium activated CsI(Tl) crystal, sodium iodide crystal or the like may be disposed within the housing 38 and may be connected to a photomultiplier tube 42. The cesium iodide (Tl) crystal absorbs all incident gamma radiation and converts the radiate energy into a small pulse of light. The photomultiplier tube 42 then amplifies the pulse of light generated by the crystal 40 and converts the same into an electrical pulse. The photomultipliier tube may be provided with a plurality of connector pins 44 adapted for connection to electrical control circuitry that is capable of receiving the output pulses of the photomultiplier tube and processing the same for use.

Signal electronics 46 may also be disposed within the radiation detector 30 and may be electrically connected to the pins 44 of the photomultiplier tube. An output signal conductor 48 may be provided to transmit electrical signals from the signal electronics 46 to signal processing electronics.

As shown in FIG. 4, the crystal 40 and the photomultiplier tube 42 are supported within the housing 36 by means of sealant rings 50 and 52 which support the crystal and photomultiplier tube in spaced relation with the housing and maintain the housing in sealed condition.

As indicated above, most trend concepts employed in container fill levels sensing are based upon "no-no go" (or non-linear) measurements. Thus, for example, a familiar trending technique is one where a count of passed (or failed) containers per total basis product court, or per unit time, is recorded. This number can be compared to a standard (acceptable) count and action taken accordingly. The number may also be added algebraically by assigning minus 1 ($-1$) to each underfill and a plus 1 ($+1$) to each overfill; such algebraically computed number providing an indication of fill trends.

Linear averaging, on the other hand, provides a signal proportional to the fill level that is detected. This can be illustrated graphically, as shown in FIG. 5, where $x$ and $y$ represent variation in gamma count achieved by attenuation of the radiation field as it is passed through a filled container. A and $b$ represent minimum and maximum fill heights caused by the height of the opening 34 in the lead collimator 42 as shown in FIG. 3.

A nominal fill level $f_n$ would produce, in this idealized curve, a gamma count $I_n$. It is apparent that proportional values above and below the nominal fill level can be quite easily detected. If the gamma count to fill level curve for each container measurement were well defined, the curve would be represented by a straight line as illustrated in FIG. 5. In actual practice, however, the gamma count/fill level curve for each container measurements is not so well defined that a single line curve is presented. Because of the statistical parameters bearing upon each discrete reading, the curve tends to become a band as illustrated in FIG. 6. This bandedness is due to such things as product slosh, container non-uniformity, conveyer bounce and isotope source randomness. Thus, there is a degree of uncertainty for each container reading but the uncertainty will not generally result in accumulative error if the data is averaged.

The technique of linear averaging tends to reduce the bandedness of the curve shown in FIG. 6, by averaging the parameters causing bandedness, such as product slosh, isotope randomness, etc. to be averaged to their nominal or mean value. The result, therefore, is a more precisely defined curve more closely representing the line curve of FIG. 5.

In accordance with the present invention, averaging computation is performed electronically and various types of averages such as block average, running average and selective averages can be implemented as desired without departing from the spirit or scope of the present invention.

Where block averaging is employed, a designated number $n$ of output signals may be selected and an output signal may be provided after every $n$th container is inspected, where $n$ is the average base. The signal (gamma count) for each container may be divided by $n$ and stored in a temporary memory circuit. The sum of $n$ such attenuated signals compose the average (base $n$) signal which is employed to provide a display of average fill.

A running average may be performed in a manner similar to block averaging but is continuously updated even though the average base remains the same. For example, where $n$ is the average base each discrete signal (gamma count) may be divided by $n$ and stored in a temporary memory. As each new increment is summed, after the base $n$ number of averaging signals has been accumulated, the oldest data ($n$ samples old) will be deleted from the accumulated signals to be averaged. Thus, a new average signal will be provided which may be displayed after each container is sampled. The average will be representative of a running average of the last $n$ container fill levels that are detected.

Basic schematic circuitry is illustrated in block diagram form in FIG. 7, where a gamma scintillator detector 54 of nature illustrated at 36 in FIG. 4 may provide signal pulse output responsive to the fill level detected in each container being conveyed past an inspection station. The pulses then may be conducted to a pulse discriminator circuit 56 constituting a part of the sequential averaging system. The discriminator circuit may select for processing only the higher energy (non-attenuated) gamma pulses. An analog integrator circuit 58 may be provided to count pulses provided by the discriminator circuit 56 and may be preceded by a pulse shaper circuit 60 that achieves pulses of consistant width and amplitude for integration. The integrator circuit, in addition to providing a pulse counting facility, also provides an analog signal (proportional to the gamma count) that is employed to drive an analog display 72 such as a strip chart recorder.

An average sum and hold circuit 64 may be provided to receive the output of the integrator circuit 58 and to average and retain particular groups of signals received from the integrator circuit. The circuit 64 may convert the counted pulse signals from the integrator into analog signals which may then be temporarily stored in an analog storage circuit 66 before being conducted to an output calibrate amplifier circuit 68. The output calibrate amplifier serves to buffer the analog (average) signal into a display signal which is then conducted to the analog display circuit 62 for visual presentation. This is accomplished by modifying the gain of the amplifier circuit to achieve a display signal in appropriate units such as inches, milliliters, etc.

With reference now to FIG. 8, non-sequential (filling head selection) averaging, may generally take the circuit form illustrated in FIG. 7, but may include a synchronization circuit causing a discrete container storage circuit to be activated by synchronization control in order that a specific measurement will be averaged only if a condition of synchronization exists between the number of filling heads of the machine and the number of containers inspected for fill level. A gamma scintillator detector circuit 70, a pulse discriminator circuit 72, a pulse shaper circuit 74 and an integrator circuit 76 may be provided that are essentially identical, as compared to the circuits 54 through 60 shown in FIG. 7. A discrete container memory circuit 78 may be provided to receive the output signal from the integrator circuit 76 and may retain the integrator signals until such time as synchronization is confirmed, whereupon the signals may be transmitted to an average sum and hold circuit 80 and then to an analog storage circuit 82, an output calibrate amplifier circuit 84 and a display circuit 86 which may be constructed and may function essentially identically, as compared to the circuits 64, 66, 68 and 62, respectively, as described above in connection with FIG. 7.

A filler switch 88 may be disposed adjacent to the rotary element 12 of the filling machine 10 and may be actuated by an actuating device 90 carried by the rotary mechanism after completion of each revolution of the filling machine. The switch 88, when actuated, will provide a signal which, as indicated in FIG. 8, may be transmitted to a synchronization comparator circuit 92. As containers are being conveyed from the filling machine on the discharge conveyer 22 past the inspection station, the containers inspected may be counted by a container counter circuit 94 and a container count output will be provided that may be transmitted both to the synchronization comparator circuit 92 and to a valve select circuit 96. The valve select circuit is in turn capable of transmitting an output signal to a signal gate circuit 98. The output of the synchronization comparator, assuming the count established by comparison of the filler switch signal and the container count signal are properly synchronized, will cause the signal gate 98 to transmit a signal to the discrete container memory circuit 78, thereby releasing the stored signals for transmission to the average sum and hold circuit 80. The signals stored in the discrete container memory circuit 78, therefore, will not be released for accumulation and averaging until such time as an appropriate signal has been received from the synchronization circuitry. If one of the filling heads of the machine fails to fill a container during one revolution of the machine or, if for some other reason, a container is removed from the discharge conveyer 22, the synchronization circuit will identify the discrepancy and cause deletion of all of the signals accumulated for that particular revolution of the filling machine. The average signal reflected by the display therefore will remain free of any error that might otherwise result if an improper number of containers is discharged from the filling machine.

The synchronization circuitry may also be employed for identification of particular filling heads that were employed to fill particular containers being conveyed through the inspection zone. The filler switch 88 will be caused to provide a strobe pulse after completion of each revolution of the filling machine. Under normal operating conditions, there will be a container from a specific filling head within the inspection zone of the fill inspection apparatus located downstream of the filling machine, at the instant each strobe signal is received. Moreover, the container counter 94 will have counted as many containers as there are filling heads between strobe signals. If this counter should differ, the container fill signal taken during that revolution will be discarded and will not be included in the average summation.

As an example, assume that the filling machine contains 72 filling heads and the position of the sensor or fill level detector is such that container number 9, having been filled by filling head number 9, is in the inspection zone at the time the strobe signal is generated. If container number 9 fails to be present in the inspection zone, the signal gate 98 will not be opened because a discrepancy will exist between the strobe signal and the container count and therefore the sample will be discarded. Moreover, if discrepant, the counter will be forced to number 9 at the time the strobe signal is generated. During the next revolution of the filling machine, under normal conditions, the counter will advance through filling head number 72, will reset to number 1, and advance on to number 9. Should a container be missing during that revolution, the counter will not advance to number 9. This non-synchronous condition will occur only rarely, but when it does occur the only effect will be elimination of sampling concerning that particular revolution. This feature prevents inaccurate fill level averaging.

It should be noted that the logic circuitry provided by the synchronization circuit and its relation with product fill level signal generation circuitry clearly defines a "logic window," enabling the operator of the machine to display a linear average related to any particular filling head of the machine, thereby indicating the average fill level generated by that particular filling head so that the containers filled thereby are positively identified as being properly or improperly filled.

Although output signals of the pulse averaging circuitry may be displayed by analog display means, as discussed above in connection with FIGS. 7 and 8, and shown in FIGS. 9 and 10, the pulse signals may also be processed for digital display or for both digital display for temporary or permanent display. The analog display may achieve a permanent record in the form of a strip chart or the like of the averaged signals.

In FIG. 9 a gamma scintillator detector circuit 100 and a pulse discriminator circuit 102 may be constructed and may function identically as compared to the respective circuits 54 and 56, shown in FIG. 7. The output of the pulse discriminator 102 may be conducted to a division counter 104 that performs an attenuation of the signal received. The division counter circuit 104 may divide each of the signals received by 1/n and then may provide an output that is received by a digital accumulator circuit 106 that serves to accumulate and hold signals forming a block average. After the block of n number of signals have been averaged, an output signal will be transmitted to a digital display circuit 108 for immediate display. The digital display may, if desired, take the form of a digital printer, if a permanent record is desired, or may take any suitable type of temporary display giving a visual readout of the last accumulated block average.

Simultaneously, if desired, a digital analog converter circuit 110 may be provided to receive the digital signals and convert the same into the form of analog signals that may be received by an analog display mechanism, such as a strip chart or the like. It is apparent, therefore, that both a digital and analog display of the averaged signals may be provided simultaneously.

With reference now to FIG. 10, a gamma scintillator detector circuit 114, a pulse discriminator circuit 116 and a division counter circuit 118 may be provided, having, if desired, the same construction and function as the circuits 100, 102 and 104, respectively, of FIG. 9 and the division counter circuit 118 may provide an output signal that is conducted to a discrete container memory circuit 120 having a facility for serial storage of output signals, which may be released to a digital accumulator circuit 122 following confirmation of synchronization between the number of filling heads of a filling machine and the number of containers dispensed during one filling cycle of the machine. The output of the digital accumulator 122 may be transmitted simultaneously to a digital display circuit 124 similar to the display circuit 108, illustrated in FIG. 9, and to a digital to analog converter 126, which converts the digital signal to an analog signal for display in the form of a strip chart or the like by an analog display circuit 128.

The discrete container memory may function to transmit signals to the accumulator circuit 122 responsive to a synchronization circuit including a filler switch 130, such as that shown at 88 in FIG. 1, which functions to generate a strobe pulse at the end of each rotational cycle of the filling machine. A container counter circuit 132 may be employed to count the physical number of containers being conveyed by a discharge conveyer from the filling machine and may transmit its output to a synchronization comparator circuit 134 and to a valve select circuit 136 in similar manner as discussed above regarding FIG. 8. A gate signal circuit 138 may receive the output of the synchronization comparator circuit 134 and may function to transmit a control signal to the discrete container memory circuit 120 if appropriate signals are received from the synchronization comparator and the valve select circuit. After the discrete container memory circuit 78 has been gated the accumulated fill level signals will be transmitted to the average sum and hold circuit 80 for mathematical averaging after which the average signal obtained will be displayed in the manner indicated above. The synchronization circuit therefore prevents averaging of accumulated signals until synchronization is verified.

It is therefore apparent, in view of the foregoing, a novel method and apparatus have been provided by the present invention for inspecting containers being filled by an automatic filling machine and for obtaining linear averaging of the fill level of all of the inspected containers. Depending upon the nature of the output signals desired, the averaging concept may conveniently take the form of block averaging where containers filled by a selected group of filling heads may be averaged. For example, linear averaging computation may be achieved relating to containers filled by the first ten filling heads of a 72 head filling machine over a specific selected number of fills for example ten fills and a display either temporary or permanent and either analog or digital may be provided to reflect the average fill level of the group of filling heads concerned. Means may be also provided to insure that the fill level average obtained reflects an average of all of the containers filled by each of the selected filling heads. For example, if one container is not filled by one of the selected filling heads or if for some other reason the container is removed from the discharge of the filling machine the accumulated and averaged signals will be deleted and will not be displayed. An averaging signal will be displayed only if it reflects a proper number of containers having been filled by a selected number of filling heads.

After one block cycle is complete and an averaging signal is displayed containers filled by another block of filling heads may be inspected and averaged for fill level. For example, containers relating to filling heads numbers 11-20 of a 72 head filling machine will be linearly averaged in like manner.

By employing means to insure relation of each container to a specific filling head, obviously a logic window is developed that will enable the operator of the machine to detect a specific filling head that might require adjustment.

If desired a running average of fill level signals may be accomplished either of a selected group of filling heads of the machine or of fill levels detected by inspecting containers relating to each of the filling heads of a container filling machine. If it is desired to detect the fill level relating to each of the filling heads of a machine having a large number of filling heads, it will necessitate the use of a small computer or some other suitable facility for achieving a large number of rapid mathematical calculations. In order to simplify the collection and display of averaging information it may be deemed appropriate to select small groups of filling heads and to calculate block or running averages of the fill level of each of the selected filling heads of the machine.

Individual valves may be monitored and displayed on any type of multiple head filling machine without regard to the total number of filling heads, because only a single valve is selected for observation at a given time. Each valve may then be inspected in time sequence.

Where a running average is conducted, a selected number $n$ of filling cycles may be utilized and $n$ number of fill level signals may be collected representative of each selected filling head. After $n$ number has been reached, the running selection may be continued by deleting the oldest signal and by adding the newest signal and averaging the collection of signals after each revolution of the filling machine. It is apparent that the present invention affords substantial latitude in the type of averaging display depending upon the degree of sophistication with which the container inspection apparatus is provided.

It is therefore seen that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters, hereinabove set forth or shown in the accompanying drawings, are to be interpreted as illustrative and not in any limiting sense.

What is claimed is:

1. A method of monitoring and averaging the fill level of containers being filled by an automatic filling machine having a number of filling heads, said method comprising the steps of:
   conveying said filled containers in linear manner from said filling machine;
   passing said filled containers through a beam of radiation being emitted from a source of radiation;
   producing electrical fill level signals responsive to attenuation of said beam of radiation resulting from detection of the fill height of each of said successive filled containers;
   accumulating a predetermined number of successive electrical fill level signals in a memory system;
   extracting a selected group of said electrical fill level signals from said memory system;
   conducting a linear average of said selected group of said electrical fill level signals;
   producing an electrical output signal responsive to the average of said selected group of said electrical fill level signals; and
   displaying said output signal.

2. The method of claim 1 wherein said selected group of said electrical fill level signals comprises all of said fill level signals stored by said memory system and said method includes the steps of:
   adding successive electrical fill level signals to said memory system and simultaneously deleting the oldest of said successive signals from said memory system while maintaining said predetermined number of successive electrical signals constant;
   conducting said linear average of said predetermined number of successive electrical signals after each addition and deletion of said signals;
   generating an output signal reflecting said average after each addition and deletion; and
   said display of said output signal being representative of said average of said output signals.

3. The method of claim 1 wherein:
   said selected group of said successive electrical fill level signals corresponds to the number of filling heads of said filling machine.

4. The method of claim 1 including the steps of:
   counting containers being filled and dispensed by said filling machine;
   comparing said counted containers with a known numerical sequence; and
   omitting said displaying of said output signal and deleting all stored signals from said memory system if said counted containers fail to correspond to said known numerical sequence.

5. The method recited in claim 1, including the method steps of:
   holding a predetermined accumulated average representative of the containers filled by a predetermined number of the filling heads of the filling machine while accumulating a subsequent selected number of fill level signals for subsequent averaging;
   generating an analog signal representing the linear average of the signals being held; and
   said output signal displayed reflecting the linear average of the signals being held.

6. A method of monitoring containers being filled by an automatic filling machine having a plurality of filling heads, said method comprising the steps of:
- conveying said filled containers in linear and serial manner from said filling machine;
- passing said filled containers in serial manner through a beam of radiation being emitted from a source of radiation;
- producing electrical fill level signals responsive to attenuation of said beam of radiation resulting from detection of the fill height of said successive containers;
- accumulating a predetermined number of successive electrical fill level signals in a memory system corresponding to a selected number of filling heads of said filling machine;
- conducting a linear average of said accumulated electrical fill level signals;
- producing an electrical output signal responsive to the linear average of said fill level signals;
- displaying said output signal;
- successively adding successive electrical fill level signals to said memory system and simultaneously deleting the oldest of said successive signals while maintaining said predetermined number of successive electrical signals constant;
- conducting a linear average of said predetermined number of successive electrical signals after each successive addition and deletion of said signals;
- producing an output signal responsive to each averaging sequence; and
- successively displaying each of said output signals.

7. The method recited in claim 6 including the steps of:
- counting containers being filled and dispensed by said filling machine;
- comparing said counted containers with the number of filling heads of said filling machine; and
- deleting all accumulated signals from said memory system if said counted containers fail to correspond with the numerical sequence of said filling heads of said filling machine.

8. The method recited in claim 6 including the step of:
- identifying containers filled by certain filling heads of said filling machine;
- selecting fill level signals relating to said identified containers;
- conducting a linear average of the fill height of said identified containers;
- generating a signal responsive to said linear average; and
- displaying said linear average signal.

9. A method of obtaining linear averaging information relating to the fill height of containers filled by selected ones of the filling heads of a container filling machine having a plurality of filling heads, said method comprising:
- conveying said filled containers in linear and serial manner from said filling machine;
- passing said filled containers through a beam of radiation being emitted from a source of radiation;
- producing electrical fill level signals responsive to attenuation of said beam of radiation resulting from detection of the fill height of each of said successive filled containers;
- selecting electrical fill level signals relating to successive containers filled by selected ones of the filling heads of said container filling machine;
- accumulating, in a memory system, a predetermined number of successive electrical signals relating to containers filled by said selected ones of said filling heads;
- conducting a linear average of said accumulated number of signals;
- producing an electrical output signal responsive to said linear average of said electrical fill level signals; and
- displaying said output signal.

10. A method as recited in claim 9 wherein: successive fill level signals relating to containers filled by individual filling heads of said filling machine are accumulated in numerical sequence in said memory system; and
- a predetermined number of successive signals relating to containers filled by individual filling heads are averaged in linear manner for identification of the average container filling height of each of the individual filling heads of said container filling machine.

11. A method as recited in claim 9 wherein said selected fill level signals relate to containers filled by a selected one of the filling heads of said container filling machine and, following the step of displaying said output signals, including the following steps:
- clearing said memory system of accumulated fill level data;
- selecting electrical fill level signals relating to containers filled by the next successive filling head of said container filling machine; and
- repeating the steps of conducting a linear average said fill level signals, producing an output signal representative of said linear average of the electrical fill level signals generated responsive to radiation inspection of selected containers and displaying said output signal.

12. A method as recited in claim 9 including the steps of:
- counting containers being filled and dispensed by said filling machine;
- comparing said counted containers with a selected number; and
- omitting said displaying of said output signals and clearing said memory system of accumulated signals if the number of containers counted fail to correspond to said selected number.

13. Apparatus for obtaining linear averaging information relating to the fill level of containers filled by an automatic filling machine and conveyed from said machine by a discharge conveyer, said apparatus comprising:
- means for detecting the fill level of each container being conveyed by said discharge conveyer and for translating said fill level into electrical signals representative of the fill level of each container;
- means for selecting particular ones of said electrical signals from said detecting and translating means;
- means for shaping said electrical signals into pulses of consistent width and amplitude;
- integrator means for counting said shaped pulses and providing an analog signal proportional to the fill level detected by said fill level detecting means;

averaging means for accumulating a selected number of said analog signals pertaining to a selected number of detected containers and for generating an average analog signal representing the average of said analog signals; and means for displaying said average analog signal.

14. Apparatus as recited in claim 13 including:

a discrete container signal memory for serial accumulation of signals from said integrator means; and synchronization means responsive to comparison of the number of containers detected to a predetermined number for transmitting a release signal to said discrete container memory releasing said accumulated signals to said averaging means if said numbers synchronize and deleting said accumulated signals if said number fail to synchronize.

15. Apparatus as recited in claim 14:

said synchronization means comprising a synchronization comparator circuit;

said predetermined number relating to a selected number of filling heads of said filling machine;

means for transmitting said predetermined number and said container count number to said comparator means; and gating means between said synchronization comparator and said discrete container signal memory and being responsive to a signal from said synchronization comparator for transmitting said accumulated signals to said averaging means or for deleting said accumulated signals.

16. Apparatus as recited in claim 14, wherein said synchronization means comprises:

a synchronization comparator circuit;

a filler switch carried by said filling machine and being actuated at the completion of each filling cycle of said machine, said filler switch being in circuit with said synchronization comparator circuit and providing said comparator circuit with a predetermined reference number at each actuation of said filler switch;

a container counter circuit counting each container being conveyed through an inspection station by said discharge conveyer, said container counter circuit providing said synchronization comparator circuit with a container inspection count for comparison with said reference number; and a signal gate circuit interconnecting said synchronization comparator and said discrete container memory and being responsive to signals from said synchronization comparator for causing deletion of accumulated signals from said discrete container memory or causing transmission of accumulated signals to said averaging means.

17. Apparatus as recited in claim 13:

output calibrate amplifier means being interposed between said averaging means and said displaying means and amplifying said average analog signal to achieve signal units appropriate for display.

* * * * *

PO-1050
(5/69)

UNITED STATES PATENT OFFICE
CERTIFICATE OF CORRECTION

Patent No.  3,818,232          Dated   June 18, 1974

Inventor(s)   Frederick J. Kirkpatrick

It is certified that error appears in the above-identified patent and that said Letters Patent are hereby corrected as shown below:

Col. 1, line 50, "possible" should read --impossible--.
Col. 1, line 60, "diary" should read --dairy--.
Col. 7, line 19, "discharge" should read --discharged--.
Col. 8, line 12, "photomultipliier" should read --photomultiplier--.
Col. 9, line 55, "72" should read --62--.

Signed and sealed this 27th day of May 1975.

(SEAL)
Attest:

RUTH C. MASON
Attesting Officer

C. MARSHALL DANN
Commissioner of Patents
and Trademarks